US012654936B2

(12) United States Patent
Heggebø

(10) Patent No.: US 12,654,936 B2
(45) Date of Patent: Jun. 16, 2026

(54) CONTAINER HANDLING VEHICLE WITH CANTILEVER CONSTRUCTION AND AUTOMATED STORAGE AND RETRIEVAL SYSTEM COMPRISING A PLURALITY OF THE CONTAINER HANDLING VEHICLES

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 477 days.

(21) Appl. No.: 17/918,215

(22) PCT Filed: Apr. 9, 2021

(86) PCT No.: PCT/EP2021/059312
§ 371 (c)(1),
(2) Date: Oct. 11, 2022

(87) PCT Pub. No.: WO2021/209338
PCT Pub. Date: Oct. 21, 2021

(65) Prior Publication Data
US 2023/0144676 A1 May 11, 2023

(30) Foreign Application Priority Data
Apr. 16, 2020 (NO) .................................... 20200467

(51) Int. Cl.
*B65G 1/04* (2006.01)
*B65G 1/06* (2006.01)

(52) U.S. Cl.
CPC ......... *B65G 1/0464* (2013.01); *B65G 1/0407* (2013.01); *B65G 1/0457* (2013.01);
(Continued)

(58) Field of Classification Search
CPC .. B65G 1/0464; B65G 1/0407; B65G 1/0457; B65G 1/0478; B65G 1/065; B65G 2201/0235
See application file for complete search history.

(56) References Cited

U.S. PATENT DOCUMENTS 5,595,311 A 1/1997 Allen
10,703,564 B2 * 7/2020 Hognaland ............ B65G 1/137
(Continued)

FOREIGN PATENT DOCUMENTS

JP 60195266 U 12/1985
JP 2013144612 A 7/2013
(Continued)

OTHER PUBLICATIONS

International Search Report issued in PCT/EP2021/059312 on Oct. 14, 2021 (4 pages).
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A two-dimensional rail system includes a first set of parallel rails arranged to guide movement of container handling vehicles in a first direction across the top of the frame structure, and a second set of parallel rails arranged perpendicular to the first set of rails to guide movement of the container handling vehicles in a second direction which is perpendicular to the first direction. The first and second sets of parallel rails dividing the rail system into a plurality of grid cells. A container handling vehicle for operation on the rail system includes a wheel base unit including sets of wheels for guiding the container handling vehicle along the rail system in the first and second directions; a body unit; and a lifting device. The body unit includes: a lower section
(Continued)

which is provided on the wheel base unit; a support section extending vertically from the lower section; and a cantilever section extending horizontally from the support section. The lower section has a footprint with a horizontal extent which is equal to or less than the horizontal extent of one of the grid cells and a top surface which is at a first height. The support section has a footprint with a horizontal extent which is smaller than the footprint of the lower section. The cantilever section extends beyond the footprint of the lower section. The lifting device includes a lifting frame that is suspended from the cantilever section of the body unit. The lifting frame has a lowermost part at a second height when the lifting frame is docked in an upper position adjacent the cantilever section. The second height of the lowermost part of the lifting frame, when the lifting frame is docked in its upper position, is above the first height of the top surface of the lower section of the body unit.

18 Claims, 14 Drawing Sheets

(52) U.S. Cl.
CPC ........... *B65G 1/0478* (2013.01); *B65G 1/065* (2013.01); *B65G 2201/0235* (2013.01)

(56) References Cited

U.S. PATENT DOCUMENTS

| | | | | |
|---|---|---|---|---|
| 10,829,302 | B2 * | 11/2020 | Lindbo | B65G 57/03 |
| 11,273,980 | B2 * | 3/2022 | Ingram-Tedd | B65G 1/0464 |
| 11,390,504 | B2 * | 7/2022 | Bastian, II | B66F 9/07568 |
| 11,745,945 | B2 * | 9/2023 | Fjeldheim | B65G 1/065 |
| | | | | 414/281 |
| 12,049,358 | B2 * | 7/2024 | Clarke | H04W 4/80 |
| 2012/0321423 | A1 | 12/2012 | MacKnight | |
| 2021/0155408 | A1 * | 5/2021 | Austrheim | B65G 1/0464 |
| 2021/0237976 | A1 * | 8/2021 | Tsukamoto | B65G 1/1375 |

FOREIGN PATENT DOCUMENTS

| | | | |
|---|---|---|---|
| NO | 317366 | B1 | 10/2004 |
| TW | 201802017 | A | 1/2018 |
| WO | 2014/075937 | A1 | 5/2014 |
| WO | 2014/090684 | A1 | 6/2014 |
| WO | 2015/193278 | A1 | 12/2015 |
| WO | 2018/146304 | A1 | 8/2018 |
| WO | 2019/101725 | A1 | 5/2019 |
| WO | 2019/137870 | A1 | 7/2019 |
| WO | 2020/094339 | A1 | 5/2020 |
| WO | 2021/021807 | A1 | 2/2021 |

OTHER PUBLICATIONS

Written Opinion of the International Searching Authority issued in PCT/EP2021/059312 on Oct. 14, 2021 (9 pages).
Norwegian Search Report issued in NO 20200467 mailed on Nov. 16, 2020 (2 pages).
Otsuka, Takako, Office Action in JP2022562478, mailed May 19, 2025, 20 pages, Japan Patent Office, Toyko, Japan.
Yong Xu, First Office Action for Chinese Patent Application No. 2021800288093, dated Jan. 22, 2025, 20 pages, pub. by SIPO, Beijing, China.
Coquau, Stephane, Office Action for European Patent Application No. 21719076.8, dated Mar. 12, 2025, 5 pages, pub. by the EPO, Rijswijk Netherlands.
Anh, Le Huy, Office Action in VN1202207294, mailed Aug. 1, 2025, 4 pages, Intellectual Property Office of Vietnam, Hanoi, Vietnam.
Anonomous, Examining action in Republic of Korea patent application 10-2022-7039530, mailed Nov. 24, 2025, 22 pages (including trandlation), pub. by Korean Ministry of Intellectual Property, Daejeon, Republic of Korea.
Otsuka, Takako, Examining action in Japanese patent application 2022-562478, mailed Nov. 25, 2025, 15 pages (including transmission), pub. by Japanese Patent Office, Tokyo, Japan.

* cited by examiner

CONTAINER HANDLING VEHICLE WITH CANTILEVER CONSTRUCTION AND AUTOMATED STORAGE AND RETRIEVAL SYSTEM COMPRISING A PLURALITY OF THE CONTAINER HANDLING VEHICLES

FIELD OF THE INVENTION

The invention relates to the field of automated storage and retrieval systems. In particular, the invention relates to a container handling vehicle with a cantilever section and an automated storage and retrieval system comprising a plurality of the container handling vehicles, where the container handling vehicles have a configuration allowing two container handling vehicles to pass each other by occupying fewer grid cells on an underlying rail system compared to prior art container handling vehicles of the cantilever-type.

BACKGROUND AND PRIOR ART

FIG. 1A discloses a typical prior art automated storage and retrieval system 1 with a framework structure 100 and FIGS. 2 and 3A discloses two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings/grid openings 112 in the grid cells 122 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3A two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of set wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 is shown in in FIG. 3A and is indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1A, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1A, the storage container identified as 106' in FIG. 1A can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid is referred to as a storage cell. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3A shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves into which the wheels of the vehicles are inserted. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks (so-called "double tracks" which is described in relation to FIGS. 1B-1D below).

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1A, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1A, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1A is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

Each of the prior art container handling vehicles with cantilever construction (as disclosed in FIG. 3A) occupies at least two grid cells on the rail system which result in that, when two of the prior art container handling vehicles pass each other on neighboring grid cells, at least four grid cells are occupied.

It is thus an objective of the invention to provide a container handling vehicle, and an associated storage and retrieval system, where the number of grid cells occupied by two container handling vehicles passing each other is less than in the prior art solutions.

In particular, it is an objective of the invention to provide a container handling vehicle with a cantilever construction that occupies fewer grid cells on the rail system when passing other container handling vehicles with a cantilever construction oriented in the same direction.

SUMMARY OF THE INVENTION

The invention is set forth in the independent claims while the dependent claims describe alternatives of the invention.

The invention relates to a container handling vehicle for operation on a two-dimensional rail system comprising a first set of parallel rails arranged to guide movement of container handling vehicles in a first direction across the top of the frame structure, and a second set of parallel rails arranged perpendicular to the first set of rails to guide movement of the container handling vehicles in a second direction which is perpendicular to the first direction, the first and second sets of parallel rails dividing the rail system into a plurality of grid cells, wherein the container handling vehicle comprises:

a wheel base unit comprising sets of wheels for guiding the container handling vehicle along the rail system in the first and second directions;

a body unit comprising:

a lower section which is provided on the wheel base unit, the lower section having a footprint with a horizontal extent which is equal to or less than the horizontal extent of one of the grid cells and a top surface which is at a first height;

a support section extending vertically from the lower section, the support section having a footprint with a horizontal extent which is smaller than the footprint of the lower section; and a cantilever section extending horizontally from the support section beyond the footprint of the lower section;

a lifting device comprising a lifting frame that is suspended from the cantilever section of the body unit, the lifting frame having a lowermost part at a second height when the lifting frame is docked in an upper position adjacent the cantilever section, wherein the second height of the lowermost part of the lifting frame, when the lifting frame is docked in its upper position, is above the first height of the top surface of the lower section of the body unit.

The fact that the second height of the lowermost part of the lifting frame, when the lifting frame is docked in its upper position, is above the first height of the top surface of the lower section of the body unit. As such, the lowermost part of a docked lifting frame of a first container handling vehicle can pass over the top surface of a lower section of the body unit of a second container handling vehicle when the first and second container vehicles pass one another on adjacent grid cells.

In this way, it is possible for two container handling vehicles of the automated storage and retrieval system having the same orientation to occupy fewer grid cells when passing each other because a cantilever section of one container handling vehicle is able to pass over the lower section and wheel base unit of another container handling vehicle (with a clearance). In other words, the cantilever section of one container handling vehicle will overlap vertically with the lower section and wheel base unit of the other container handling vehicle that it is passing.

The vertical extension of the support section determines the difference between the first height and the second height. If the support section has a relatively large extension, the difference between the first height and the second height is relatively large. Similarly, if the support section has a relatively small extension, the difference between the first height and the second height is relatively small. In any case, the support section should be of such an extension that the two container handling vehicles can pass each other with a clearance between the lowermost part of the lifting frame and the top surface of the lower section. Such a clearance may be at least identical to an expected vertical movement of the lifting frame when docked in its upper position resulting from acceleration and deceleration of the container handling vehicle. In one example, the clearance between the two container handling vehicles may range from a few millimeters up to several centimeters.

A horizontal extent (in the X and Y directions) of the top surface may be the equal to, or substantially equal to, a horizontal extent of a part of the cantilever section extending horizontally beyond the support section.

The wheel base unit and body unit may be modules that can be attached one to the other. The body unit may be mounted on an upper surface of the wheel base unit or attached to it in some other way. Alternatively, the wheel base unit and the body unit can be formed in one piece, i.e. they may form one common unit.

The wheel base unit may feature a wheel arrangement having a first set of wheels for movement in a first direction upon a rail system and a second set of wheels for movement in a second direction perpendicular to the first direction. Each set of wheels comprises two pairs of wheels arranged on opposite sides of the wheel base unit. To change the direction in which the wheel base unit may travel upon the rail system, one of the sets of wheels is connected to a wheel displacement assembly. The wheel displacement assembly is able to lift and lower the connected set of wheels relative to the other set of wheels such that only the set of wheels travelling in a desired direction is in contact with the rail system. The wheel displacement assembly is driven by an electric motor. Further, two electric motors, powered by a rechargeable battery, may be connected to the set of wheels to move the wheel base unit in the desired direction.

The first height may be defined as the distance from the top of the rail system to the top of the top surface of the lower section when the lower section is mounted on the wheel base unit.

The second height may be defined as the distance from the top of the rail system to the lowermost part of the lifting frame.

The support section may extend for a height greater than a storage container and the difference between the second height and the first height may at least correspond to a height of a storage container in addition to a minor clearance. One advantage of this construction is that robots, i.e., container handling vehicles, can pass each other with an overlap independent of whether none, one or both is carrying a storage container.

The lifting device may comprise a lifting device motor and at least two lifting shafts. The at least two lifting shafts may be arranged in the cantilever section and the lifting device motor can be arranged in the lower section. The lifting device motor and at least two lifting shafts may be connected to each other via a flexible force transferring element. The force transferring element can be a belt, chain, band or another relatively flexible component able to transfer rotational movement between the lifting device motor and the lifting shafts.

The lifting device may further comprise a gripping device being configured to releasably grip a storage container and a power source, such as an independent rechargeable battery or the same battery used for displacement of the wheels, for driving the lifting device motor. To increase stability of the container handling vehicle, the battery may be arranged in the lower section or the wheel base unit (or both, for example, where there is some overlap between the lower section and the wheel base unit).

The lifting device may comprise a lifting device motor and at least two lifting shafts for raising and lowering the lifting device, wherein the lifting device motor and the at least two lifting shafts may be arranged in the cantilever section. The lifting device motor can comprise a brushless DC motor. Various types of brushless DC motors are known, including permanent magnet synchronous motor (using permanent magnets) and switched reluctance motors (does not use any permanent magnets), as described in WO 2019/137870 A1 (Applicant: Autostore Technology AS), the contents of which are incorporated herein by reference. However, the lifting device motor could comprise other forms of electric motor(s) as well.

The body unit may comprise an S-shaped housing linking the lower section, the support section and the cantilever section together (e.g., S-shaped when viewed from a side of the body unit).

In an aspect, a footprint of the lower section of the body unit may be displaced with respect to the footprint of the wheel base unit by substantially or equally a width of a wheel. The width dimension is in an axial direction of the wheel. The lower section may be positioned to extend vertically from the outer edge of a second track of the rail system under the cantilever section and from the inner edge of a first track of the rail system on an opposite side of the lower section, when the wheel base unit has its wheels positioned over the first tracks (or tracks closest to a grid opening), for example, when the container handling vehicle is positioned for lowering/raising the lifting frame into/out of a storage column of the frame structure. A footprint is defined as an outer dimension when looking in plan view of that section.

The lifting frame may be suspended on lifting bands, and the lifting frame may extend horizontally and comprise gripping devices and corner guides. A lowermost point of the corner guides may provide the lowermost part of the lifting frame such that it is this point that needs to be accounted for in terms of minimum second height for passing over or above the first height of the upper surface of the lower section.

It is further described an automated storage and retrieval system comprising a two-dimensional rail system comprising a first set of parallel rails arranged to guide movement of container handling vehicles in a first direction across the top of the frame structure, and a second set of parallel rails arranged perpendicular to the first set of rails to guide movement of the container handling vehicles in a second direction which is perpendicular to the first direction, the first and second sets of parallel rails dividing the rail system into a plurality of grid cells, wherein the automated storage and retrieval system comprises a plurality of container handling vehicles as defined above.

Two container handling vehicles of the automated storage and retrieval system, which two container handling vehicles have the same orientation, may occupy a total of three grid cells when passing each other.

The two container handling vehicles, i.e. a first container handling vehicle and a second container handling vehicle, of the automated storage and retrieval system may be configured such that the lowermost part of a docked lifting frame of the first container handling vehicle can pass over the top surface of a lower section of the body unit of the second container handling vehicle when the first and second container vehicles pass one another on adjacent grid cells. This may be made possible for example by configuring a horizontal extent (in the X and Y directions) of the top surface equal to, or substantially equal to, a horizontal extent (in the X and Y directions) of a part of the cantilever section extending horizontally beyond the support section.

The first set of rails and or the second set of rails may comprise either a single track or a double track comprising two single tracks, and a grid cell may be defined as the horizontal area occupied by a grid opening delimited by the first set of rails and second set of rails together with an area occupied by single tracks of the first and second sets of rails in the first and second directions enclosing and closest to the single grid opening.

The wheel base unit may have a footprint equal to a horizontal extent in the first and second directions of a grid cell as an underlying grid cell. In other words, the wheel base unit may have a footprint of a single grid cell.

At least one of the container handling vehicles may carry a storage container when passing another container handling vehicle. In an aspect, both container handling vehicles can carry a storage container (of a regular size) when passing each other. Clearance between the two container handling vehicles may range from a few millimeters up to several centimeters.

A lowermost point of the storage container when carried may be higher than the first height of the lower section.

A width of the support section in one direction may correspond to the width of a rail and/or two tracks.

The automated storage and retrieval system may further comprise at least one dual container handling vehicle comprising a first cantilever section arranged opposite a second cantilever section. At least a first container handling vehicle may have a first orientation and at least a second container handling vehicle may have a second orientation opposite the first orientation, and the dual container handling vehicle and the first and second container handling vehicles may occupy a total of five grid cells when simultaneously passing each other.

The relative terms "upper", "lower", "below", "above", "higher" etc. shall be understood in their normal sense and as seen in a cartesian coordinate system.

In the following, numerous specific details are introduced by way of example only to provide a thorough understanding of embodiments of the claimed system and vehicle. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention.

FIG. 1B shows a single track rail system, FIG. 1C shows a double track rail system and FIG. 1D shows a double rail system with the width and length of a container handling vehicle grid cell indicated;

In the drawings, like reference numerals have been used to indicate like parts, elements or features unless otherwise explicitly stated or implicitly understood from the context.

DETAILED DESCRIPTION OF THE INVENTION

Figure 1A:
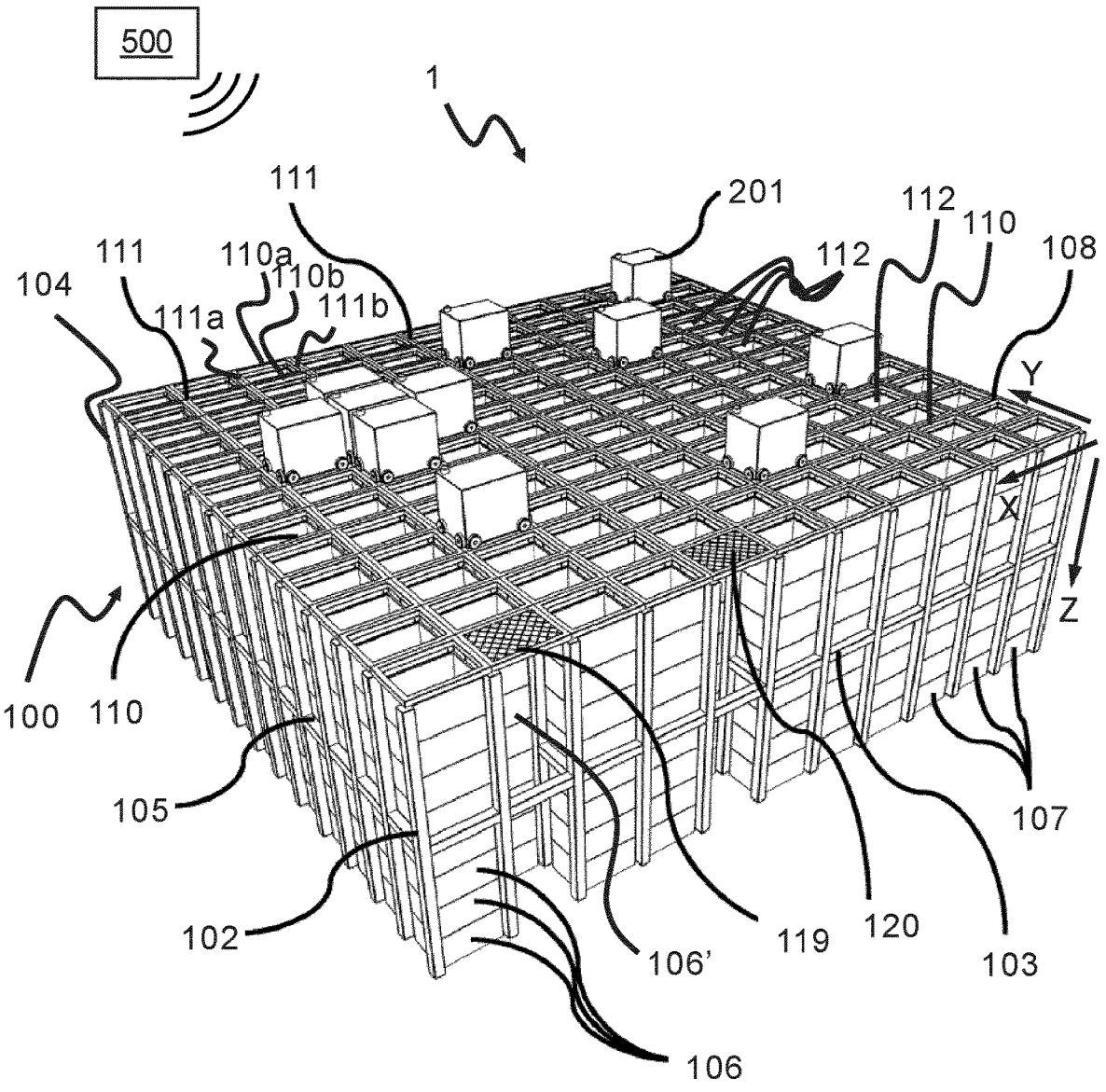
FIG. 1A is a perspective view of a framework structure of a prior art automated storage and retrieval system.

In the following, embodiments of the invention will be discussed in more detail by way of example only and with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1A-1D, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1A. For example, the framework structure 100 may have a horizontal extent of more than 700×700 columns and a storage depth of more than twelve containers.

Figure 1B:
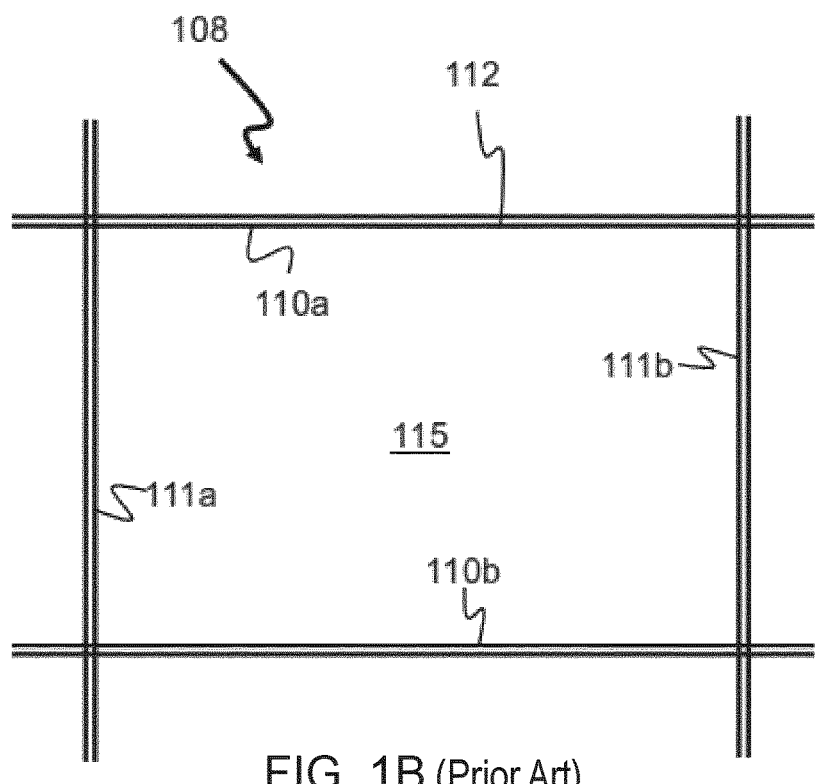
FIGS. 1B-D are top views of a container handling vehicle rail system, where
Figure 1C:
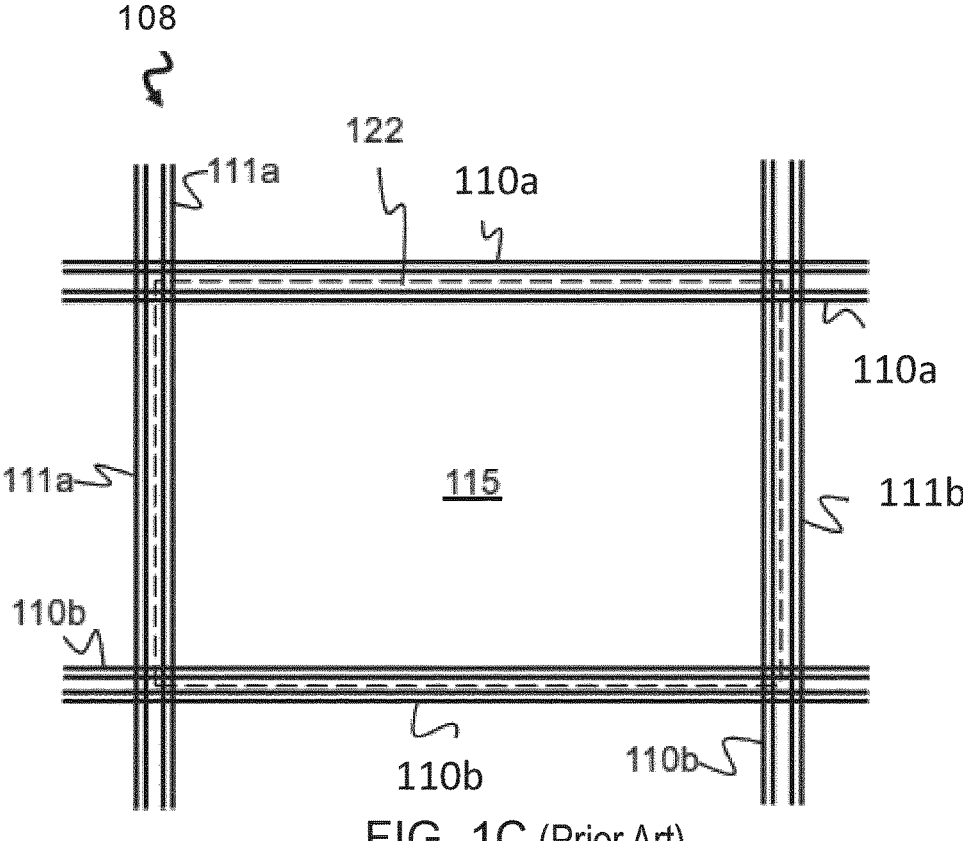

The rail system 108 may be a single rail (also denoted single track) system, as is shown in FIG. 1B. Alternatively, the rail system 108 may be a double rail (also denoted double track) system, as is shown in FIG. 1C, thus allowing a container handling vehicle 201 having a footprint generally corresponding to the lateral area defined by an access opening/grid column 112 to travel along a row of grid columns even if another container handling vehicle 201 is positioned above a grid column neighboring that row. Both the single and double track system, or a combination comprising a single and double track arrangement in a single rail system 108, forms a grid pattern in the horizontal plane P comprising a plurality of rectangular and uniform grid locations or grid cells 122, where each grid cell 122 comprises a grid opening 115 being delimited by a pair of tracks 110*a*,110*b* of the first set of rails 110 and a pair of tracks 111*a*,111*b* of the second set of rails 111. In FIG. 1C the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, tracks 110*a* and 110*b* form pairs of rails defining parallel rows of grid cells running in the X direction, and tracks 111*a* and 111*b* form pairs of rails defining parallel rows of grid cells running in the Y direction.

Figure 1D:
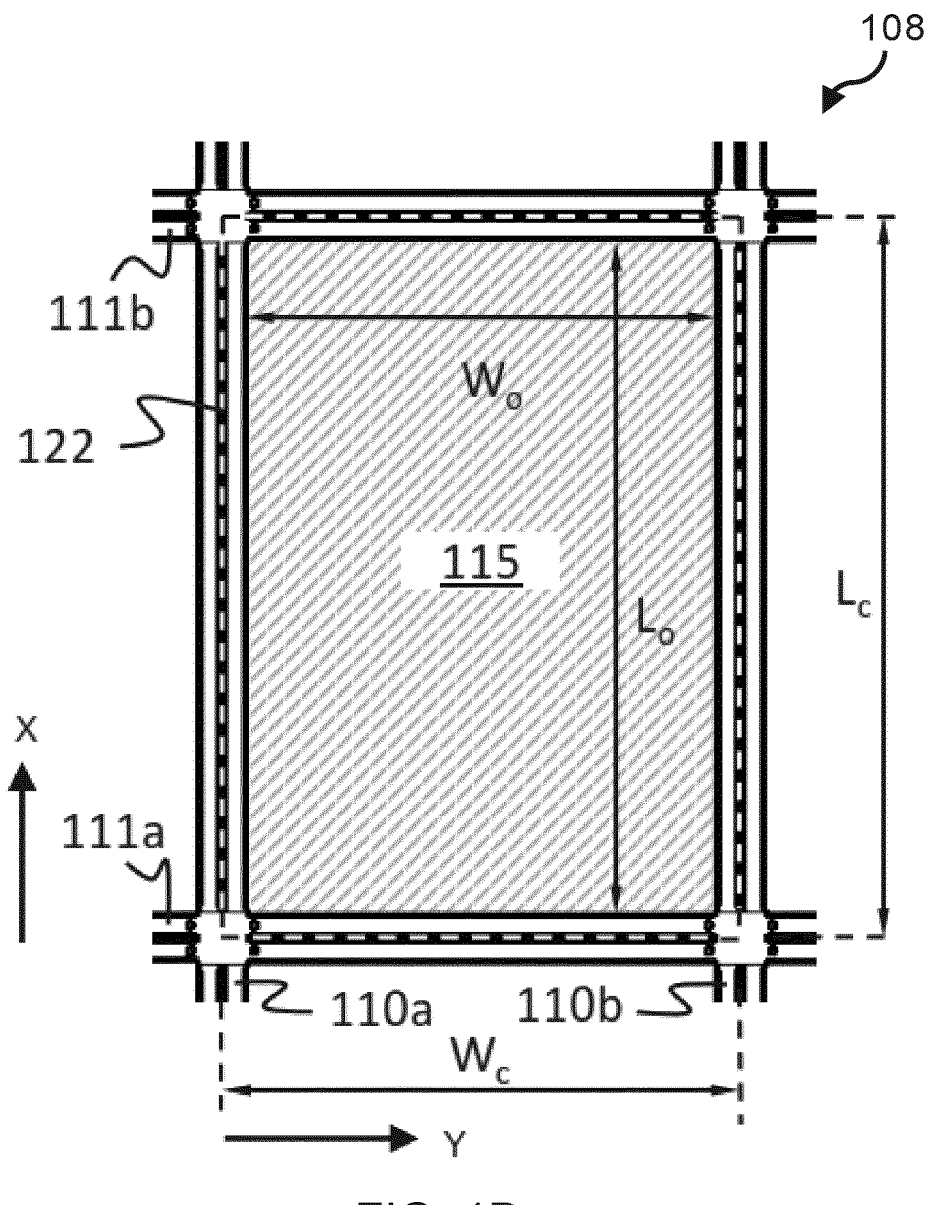
Figure 2:
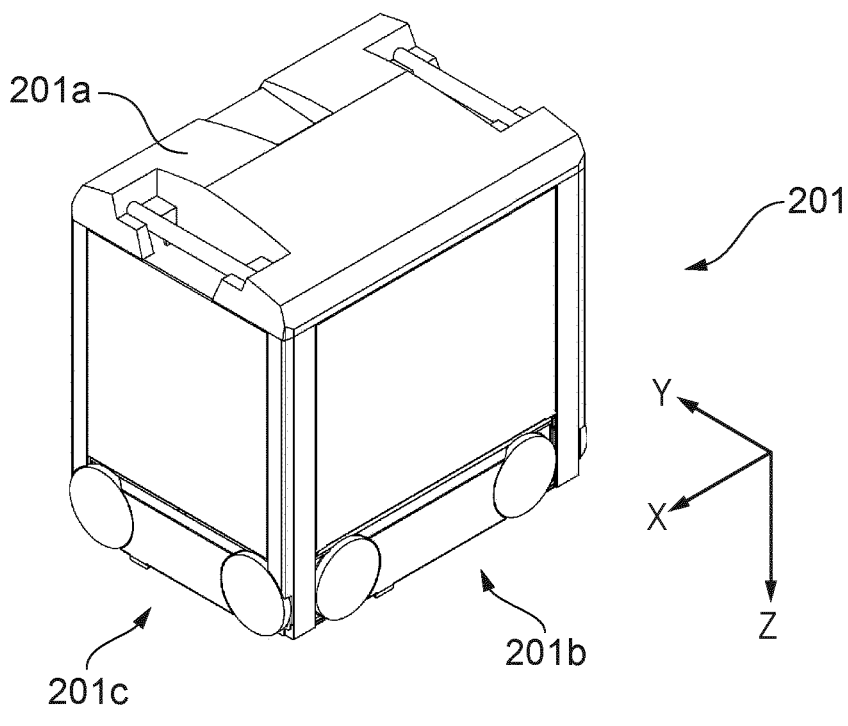
FIG. 2 is a perspective view of a prior art container handling vehicle having a centrally arranged cavity for carrying storage containers therein.

As shown in FIG. 1D, each grid cell 122 has a width We which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space therebetween.

Figure 3A:
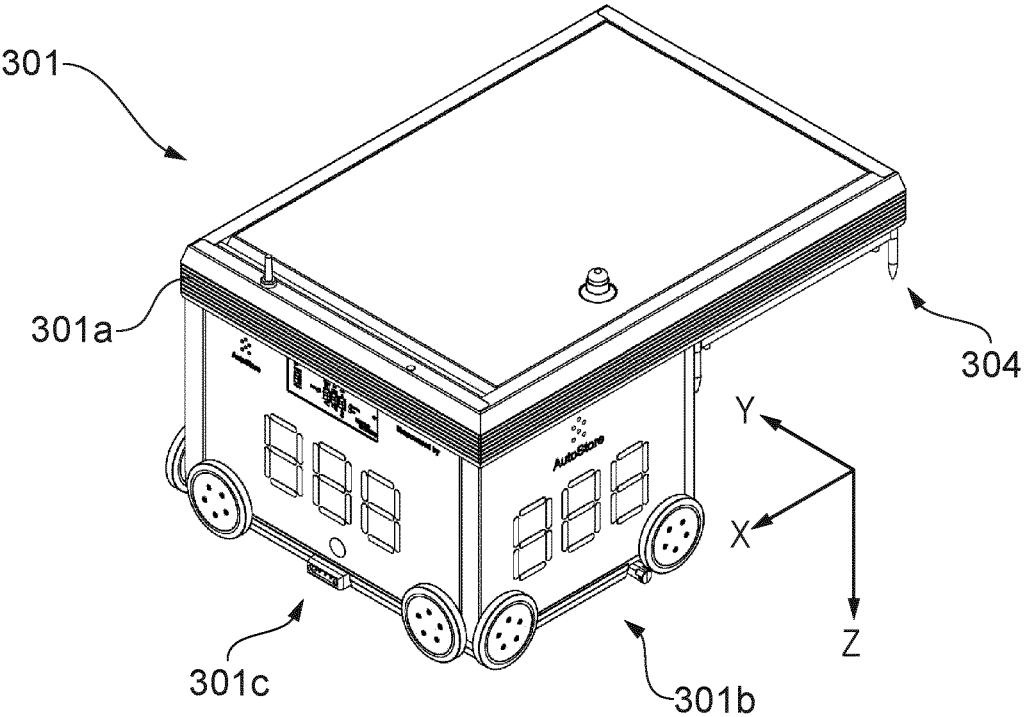
FIG. 3A is a perspective view of a prior art container handling vehicle having a cantilever for carrying storage containers underneath.

FIG. 3A is a perspective view of a prior art container handling vehicle 301 having a cantilever for carrying storage containers underneath.

Figures 3B, 3C:
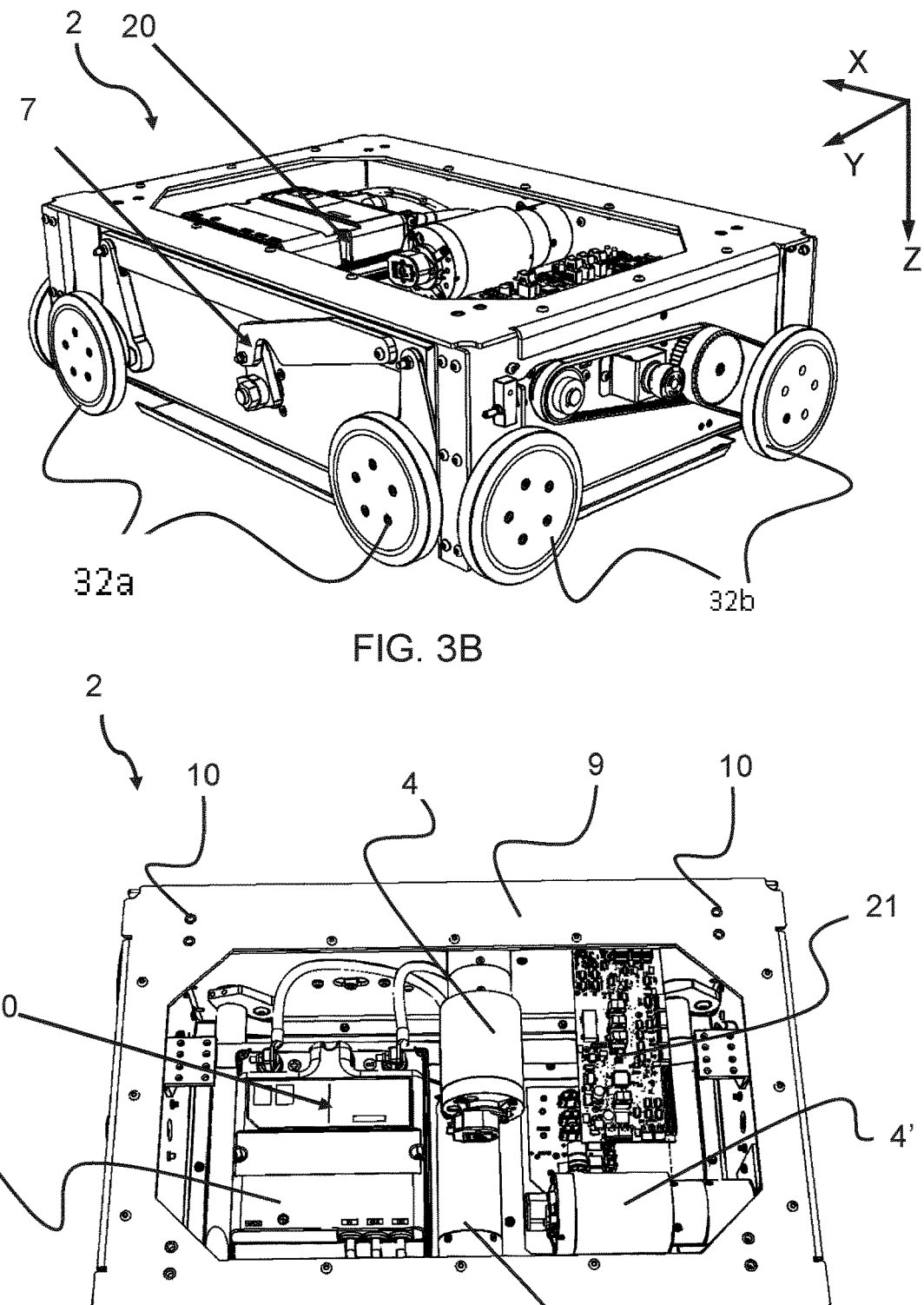
FIGS. 3B and 3C show an exemplary wheel base unit for the container handling vehicle.

An exemplary wheel base unit for a container handling vehicle 401 according to the invention is shown in FIGS. 3B and 3C. The wheel base unit 2 features a wheel arrangement 32*a*,32*b* having a first set of wheels 32*a* for movement in a first direction upon a rail system 108 and a second set of wheels 32*b* for movement in a second direction perpendicular to the first direction. Each set of wheels comprises two pairs of wheels arranged on opposite sides of the wheel base unit 2. To change the direction in which the wheel base unit may travel upon the rail system, one of the sets of wheels 32*b* is connected to a wheel displacement assembly 7. The wheel displacement assembly is able to lift and lower the connected set of wheels 32*b* relative to the other set of wheels 32*a* such that only the set of wheels travelling in a desired direction is in contact with the rail system. The wheel displacement assembly 7 is driven by an electric motor 8. Further, two electric motors 4,4', powered by a rechargeable battery 6, are connected to the set of wheels 32*a*,32*b* to move the wheel base unit in the desired direction.

Further referring to FIGS. 3B and 3C, the horizontal periphery of the wheel base unit 2 is dimensioned to fit within the horizontal area defined by a grid cell, such that two wheel base units 2 may pass each other on any adjacent grid cells of the rail system 108. In other words, the wheel base unit 2 may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference.

Figures 4A, 4B, 4C:
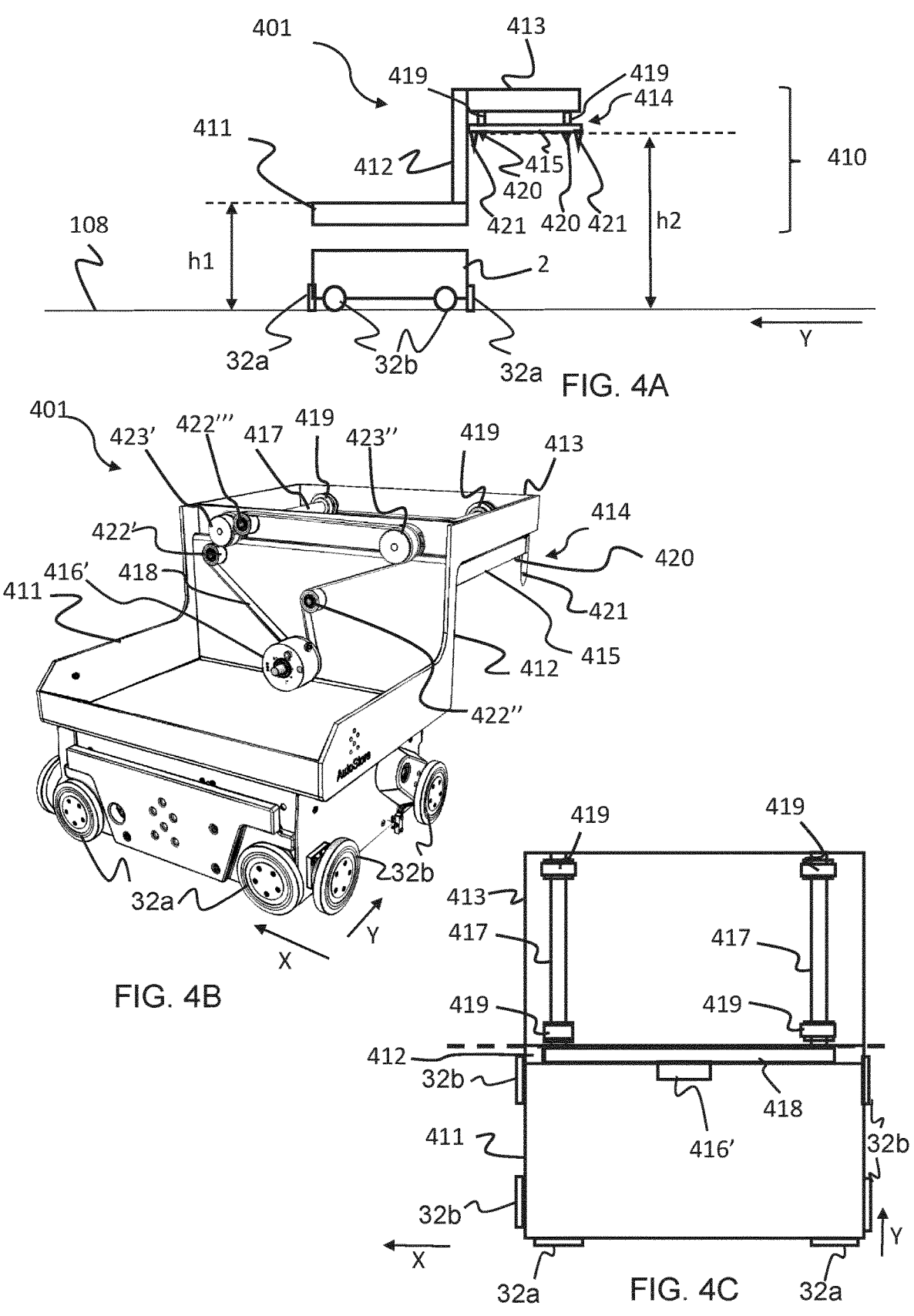
FIG. 4A is a simplified side-view of a container handling vehicle according to the invention comprising a wheel base unit and a body unit, where the body unit comprises a lower section, a support section and a cantilever section.
FIG. 4B is a perspective view of a container handling vehicle according to the invention where protective covers have been removed to better illustrate the setup of the components in a lower section, support section and cantilever section of a body unit of the container handling vehicle.
FIG. 4C is a top view of FIG. 4B.

FIG. 4A is a simplified side-view of a container handling vehicle 401 according to an embodiment of the invention comprising a wheel base unit 2 and a body unit 410, where the body unit 410 comprises a lower section 411, a support section 412 and a cantilever section 413.

Referring to FIGS. 3B and 4A, the wheel base unit 2 has a top panel/flange 9 (i.e. an upper surface) configured as a connecting interface for connection to a body unit 410 of a container handling vehicle 401. The top panel 9 have a centre opening 20 and features multiple through-holes 10 (i.e. connecting elements) suitable for a bolt connection via corresponding through-holes in a lower section 411 of the body unit 401. In other embodiments, the connecting elements of the top panel 9 may for instance be threaded pins for interaction with the through-holes of the lower section 4111. The presence of a centre opening 20 is advantageous as it provides access to internal components of the wheel base unit 2, such as the rechargeable battery 6 and an electronic control system 21.

Further referring to FIG. 4A, the body unit 410 is disclosed as comprising an S-shaped housing linking the lower section 411, the support section 412 and the cantilever section 413 together. The container handling vehicle 401 of FIG. 4A is operable on a rail system 108 as described in connection with FIGS. 1A-1D, and comprises a wheel base unit 2 and a body unit 410. The wheel base unit 2 comprising sets of wheels 32a, 32b for guiding the container handling vehicle 401 along the rail system 108 in the first and second directions X, Y. The body unit 410 comprising a lower section 411, a support section 412 and a cantilever section 413. The lower section 411 is mounted on an upper surface of the wheel base unit 2. The lower section 411 may have a footprint with a horizontal extent which is equal to or less than the horizontal extent of one of the grid cells 122 and a top surface which is at a first height h1. I.e. the first height h1 is the distance from the top of the rail system 108 to the top of the top surface of the lower section 411 when the lower section is mounted on the wheel base unit 2. The support section 412 extends vertically from the lower section 411 and has a footprint with a horizontal extent which is smaller than the footprint of the lower section 411. The width of the support section 412 (i.e. the extension in the X direction) may be equal to the width of the lower section 411 (in the X direction). The extension of the support section 412 in the Y direction is smaller than the extension of the lower section in 411 in the Y direction. Furthermore, referring to FIG. 4C, when seen in a plan view from above, the footprint of the support section 412 falls within the footprint of the lower section 411. In other words, as disclosed in FIGS. 4A-4C, the support section 412 does not extend beyond the lower section 411. The cantilever section 413 extends horizontally from the support section 412 beyond the footprint of the lower section 411 and comprises a lifting device 414 suspended from the cantilever section 413. The lifting device 414 comprising a lifting frame 415 having a lowermost part at a second height h2 when the lifting frame 415 is docked in an upper position adjacent the cantilever section 413 (FIGS. 4A and 4B show docked position of lifting frame 415). I.e. the second height h2 is the distance from the top of the rail system 108 to the lowermost part of the lifting frame 415. The lifting frame 415 is suspended from the cantilever section 413 via lifting bands 419. The lifting frame 415 may comprise gripping devices 420 extending from a lower surface thereof for connecting the lifting frame to complementary lifting holes of the storage containers 106 thereby rendering possible lifting and lowering of the storage containers 106. In addition, the lifting frame 415 may comprise guides 421 arranged in the corners of the lower surface of the lifting frame 415 to align the gripping devices 420 of the lifting frame 41 relative the complementary lifting holes on the storage containers 106. In many situations the guides 421 or the gripping devices 420 may constitute the lowermost part of the lifting frame 415 such that the second height h2 is the lowermost part of any of these components. However, according to the invention, the second height h2 of the lowermost part of the lifting frame 415, when the lifting frame 415 is docked in its upper position, is always above the first height h1 of the top surface of the lower section 411 of the body unit 410.

By ensuring that the lowermost part of a docked lifting frame 415 of a first container handling vehicle 401 can pass over the top surface of a lower section 411 of the body unit 410 of a second container handling vehicle 401 when the first and second container vehicles 401 pass one another on adjacent grid cells 122, the first and second container handling vehicles 401 can pass each other while collectively occupying fewer grid cells than required in prior art solutions.

FIG. 4B is a perspective view of a container handling vehicle 401 according to the embodiment of the invention where protective covers have been removed to better illustrate the setup of the components in the lower section 411, the support section 412 and the cantilever section 413 constituting the body unit 410 of the container handling vehicle 401. In the embodiment of FIG. 4B, the lifting device 414 is disclosed as comprising a lifting device motor 416' and at least two lifting shafts 417',417". The two lifting shafts 417',417" are arranged in parallel in the cantilever section 413. The lifting bands 419 connected to the lifting frame 415, are spooled onto and off the lifting shafts 417',417", thereby moving the lifting frame 416 and any storage container 106 carried by the lifting frame 415 up and down. Lifting shaft wheels 423',423" are arranged on each end of the lifting shafts 417 and operate together with the lifting shafts 417, respectively. As shown in FIG. 4B, the lifting device motor 416' is arranged in the lower section 411. The lifting device motor 416' and the two lifting shafts 417 are connected to each other via the lifting shaft wheels 423', 423" and an endless flexible force transferring element 418 running via sheaves 422 to ensure that the first and second lifting shafts 417 rotate simultaneously in the same direction. Any necessary power source (not shown) for supplying power to the lifting device motor 416' may be arranged in the lower section 413 in order to obtain a favorable center of gravity with reduced risk of tilting of the container handling vehicle in the event lifting a heavy storage container 106 and/or as a result of too high acceleration/deceleration of the container handling vehicle 401.

The lifting frame 415 is shown with guides 421 arranged in the corners of the lower surface of the lifting frame 415 to align the gripping devices 420 of the lifting frame 41 relative the complementary lifting holes on the storage containers 106.

Any necessary power source (not shown) for supplying power to the lifting device motor 416" may be arranged in the lower section 413 in order to obtain a favorable center of gravity with reduced risk of tilting of the container handling vehicle in the event lifting a heavy storage container 106 and/or as a result of too high acceleration/deceleration of the container handling vehicle 401.

FIG. 4C is a top view of FIG. 4B, showing the lower section 411, the support section 412 and the cantilever section 413.

FIGS. 4D-4I are examples of different setups providing opposite rotation of the lifting shafts 417',417". As disclosed in all of the examples of FIGS. 4D-4I, common to all of the force transferring setups, is the presence of a rotatable lifting device motor 416', a first and second lifting shaft wheel 423', 423" whereof each is connected for rotation with the respective lifting shafts 417',417", at least one sheave 422', 422", a force transferring element 418 in the form of an endless belt forming a closed loop and where at least one of sheaves 422',422" is arranged inside the closed loop. In addition, the first or second lifting shaft wheel 423', 423" is in contact with an inner surface of the endless belt 418 and the other of the first or second lifting shaft wheel 423', 423" is in contact with the outer surface of the endless belt 418. This is achieved by arranging one of the first or second lifting shaft wheels 423', 423" inside the closed loop formed by the force transferring element 418 and the other of the first or second lifting shaft wheel 423', 423" outside the closed loop formed by the force transferring element 418. The mutual setup of the first and second lifting shaft wheels 423', 423" (e.g., acting on opposite sides of the endless belt), the guide sheaves 422', 422" and the force transferring element 418, are such that the first and second lifting shafts 417', 417" (via first and second lifting shaft wheels 423', 423", respectively) rotate in opposite directions (counter rotates). The first and second lifting shaft wheels 423', 423" are preferably arranged in the same horizontal plane in order to ensure horizontal stability during lifting. The sheave(s) 422', 422" are arranged along the travel of the force transferring element 418 at fixed positions such that they provide for a "change" in the travel direction of the force transferring element 418. Each of the sheaves 422', 422" are arranged to lead the force transferring element 418 correctly onto the first and second lifting shaft wheel 423', 423" thereby allowing the first and second lifting shaft wheels 423', 423" (and thus the lifting shafts 417', 417") to rotate in opposite directions.

Figures 4D, 4E, 4F, 4G, 4H, 4I:
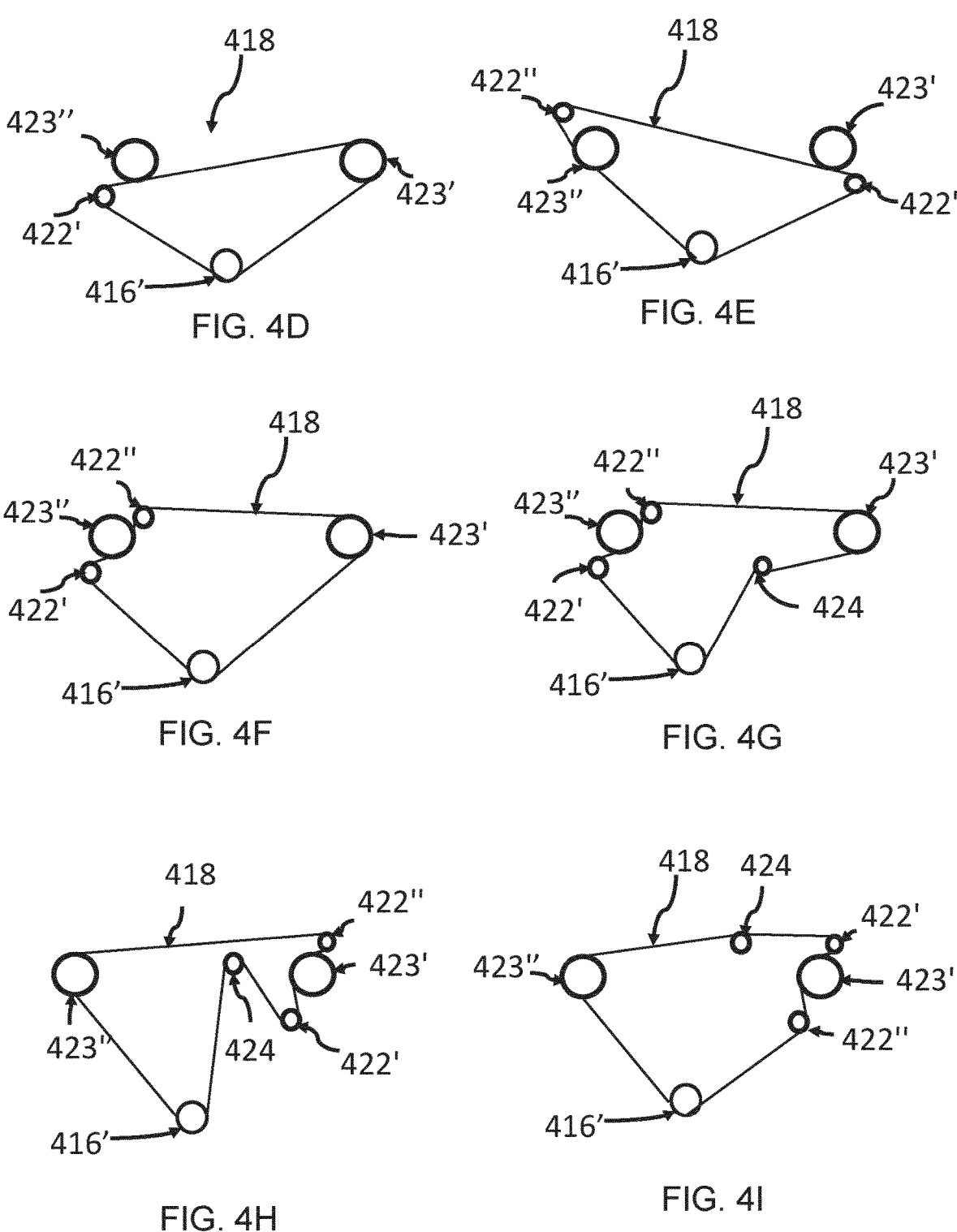
FIGS. 4D-4I are exemplary side views of different setups providing opposite rotation of the lifting shafts.

In the example in FIG. 4D, one sheave 422' is shown.

In the examples of FIGS. 4E-4I, a number of examples of force transferring setups comprising two sheaves 422', 422", are shown. The sheaves 422', 422" are arranged alternating along the path of the force transferring element 418 such that the first lifting shaft wheel 423' is followed by a sheave 422', 422" and the second lifting shaft wheel 423" is followed by a sheave 422', 422" in both directions of travel of the force transferring element 418.

In the examples of FIGS. 4G, 4H, 4I, there are disclosed examples comprising a tightening wheel 424 for tensioning of the force transferring element 418. The tightening wheel 424 may for example be an eccentric tensioning mechanism comprising a rotatable sheave with an axle that can be adjusted within an opening in a fixed bracket. The location of the tightening wheel 424 along the path of the force transferring element 418 is preferably at a location where the path length of the force transferring element 418 can be affected (i.e. the path of the force transferring element can be shortened or prolonged in order to further tension or reduce tension in the force transferring element). The tightening wheel 424 can be arranged inside (FIGS. 4G and 4I) or outside (FIG. 4H) the closed loop formed by the force transferring element 418.

In the examples in FIGS. 4D-4F, a dedicated tensioning mechanism such as a tightening wheel is not shown; however, if a tensioning mechanism is required, one of the sheaves 422' or 422" may be a tensioning mechanism and can be replaced by a tightening wheel 424.

Figure 5:
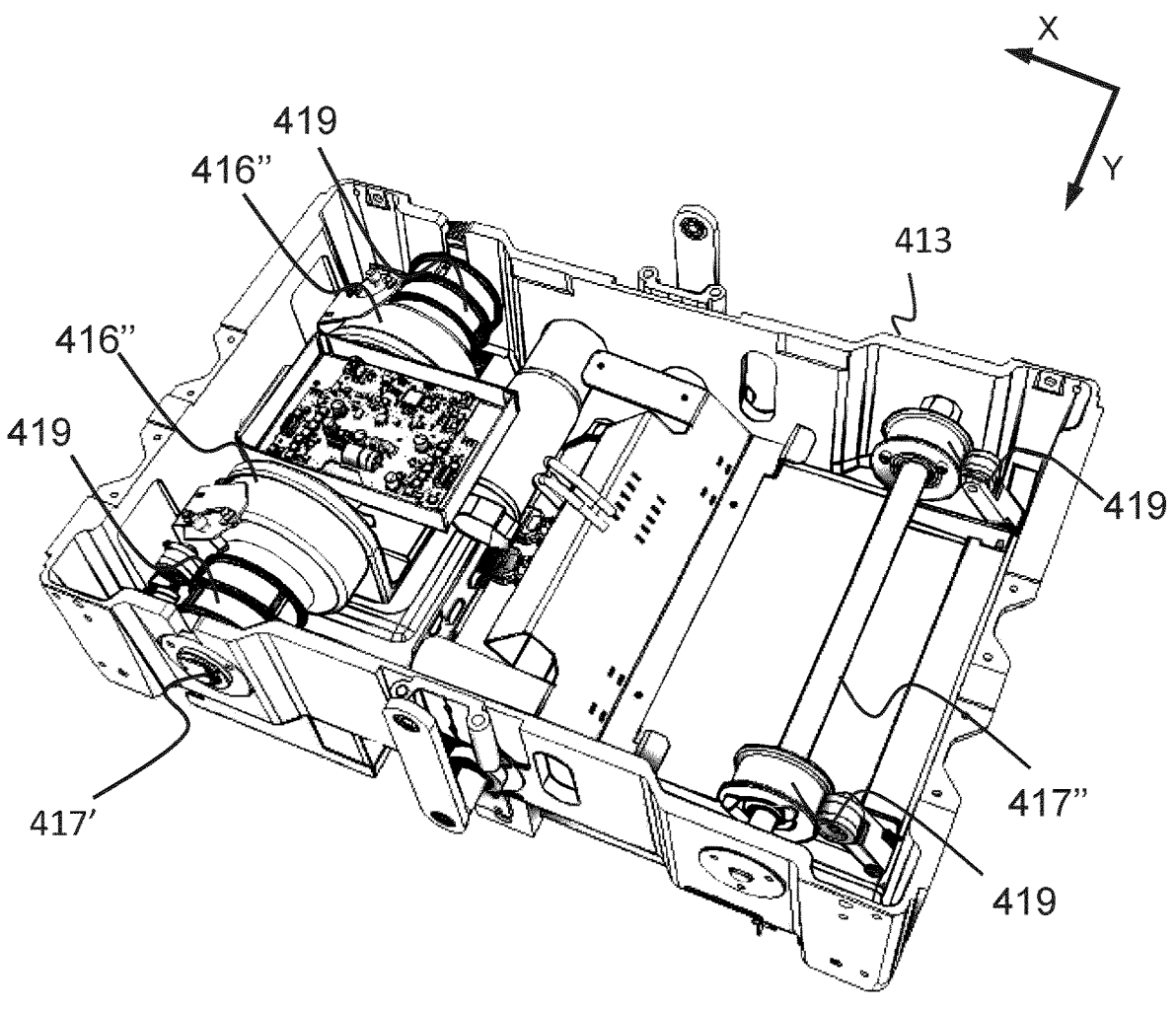
FIG. 5 is an example of the cantilever section of the body unit, and indicates which parts that may form part of the cantilever section.

FIG. 5 is an example of another setup of the lifting device 414, where, in addition to the lifting shafts 417 and the lifting bands spoolable onto and off the lifting shafts 417', 417", also the lifting device motor 416" is arranged in the cantilever section 413 of the body unit 410. The lifting device motor(s) 416" in FIG. 5 is a brushless DC motor encircling one of the lifting shafts 417', 417". Synchronous operation of the lifting shafts 417', 417" can be obtained by a synchronization element such as a force transferring element as disclosed in FIGS. 5A-5E and 6A-6H in WO 2019/137870 A1 (Applicant: Autostore Technology AS), the contents of which are incorporated herein by reference.

Figure 6A:
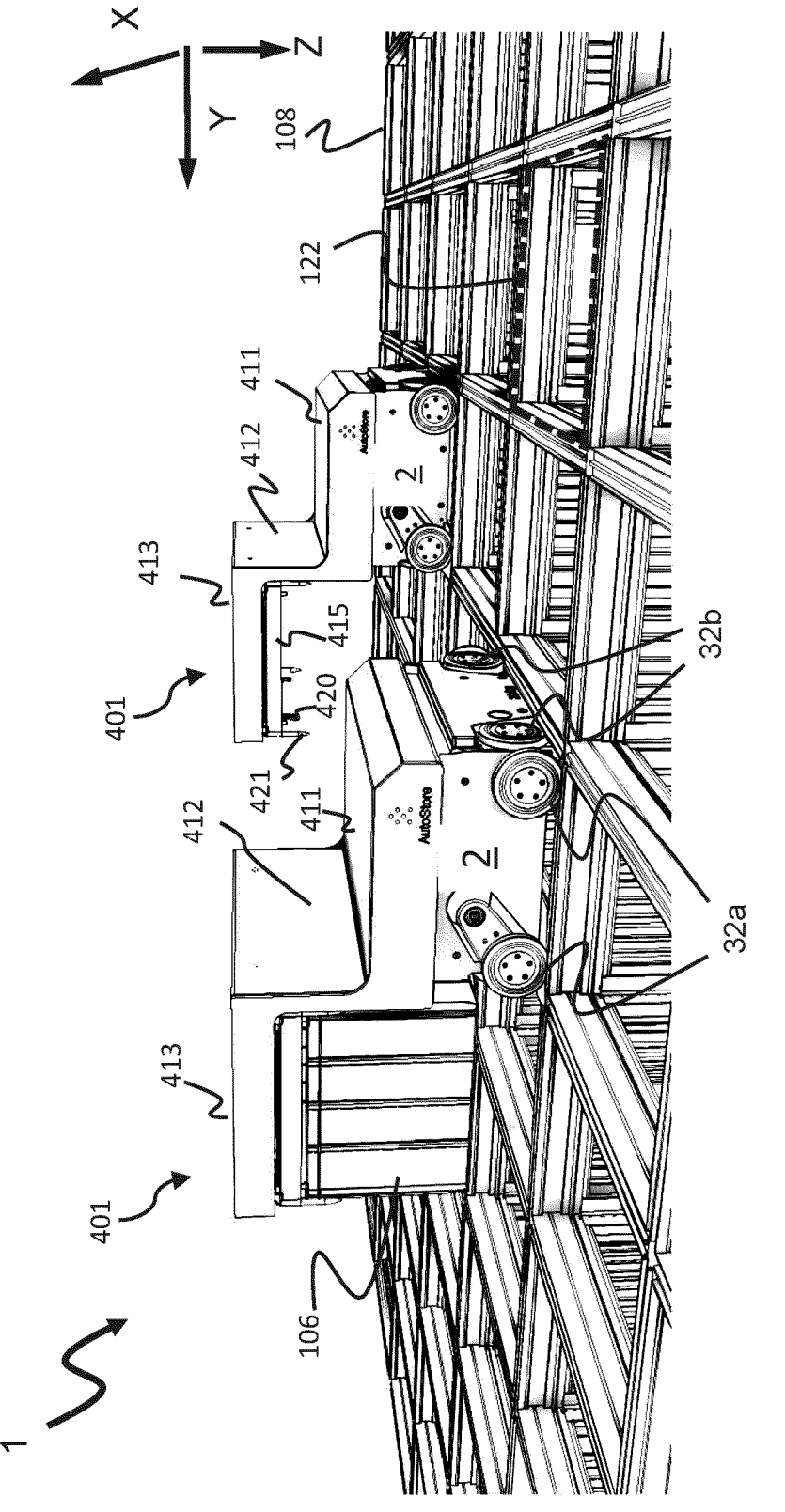
FIGS. 6A-6C show different views of a first embodiment of two container handling vehicles passing each other, where only one of the container handling vehicles can carry a storage container during passing.
Figure 6B:
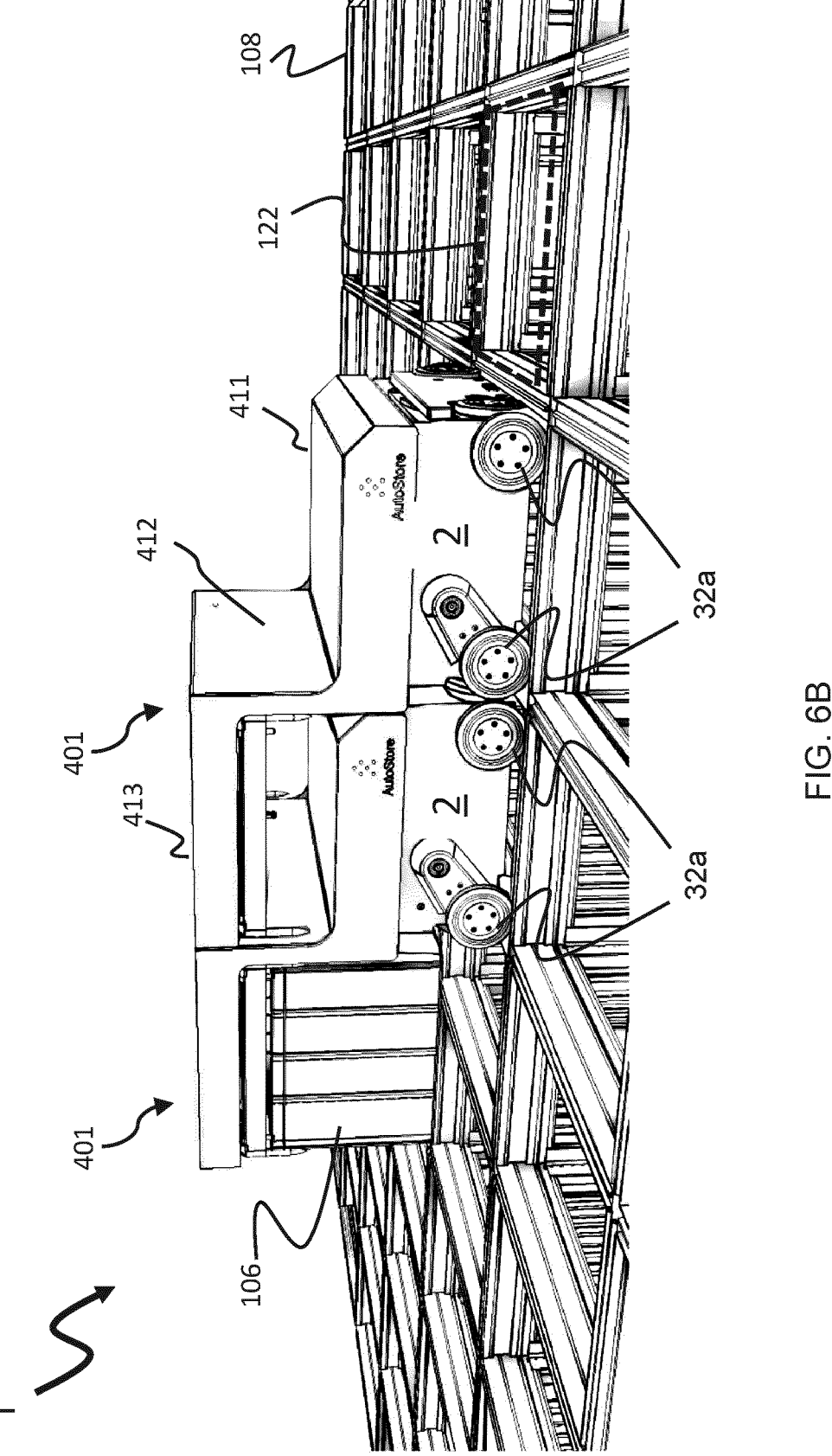
Figure 6C:
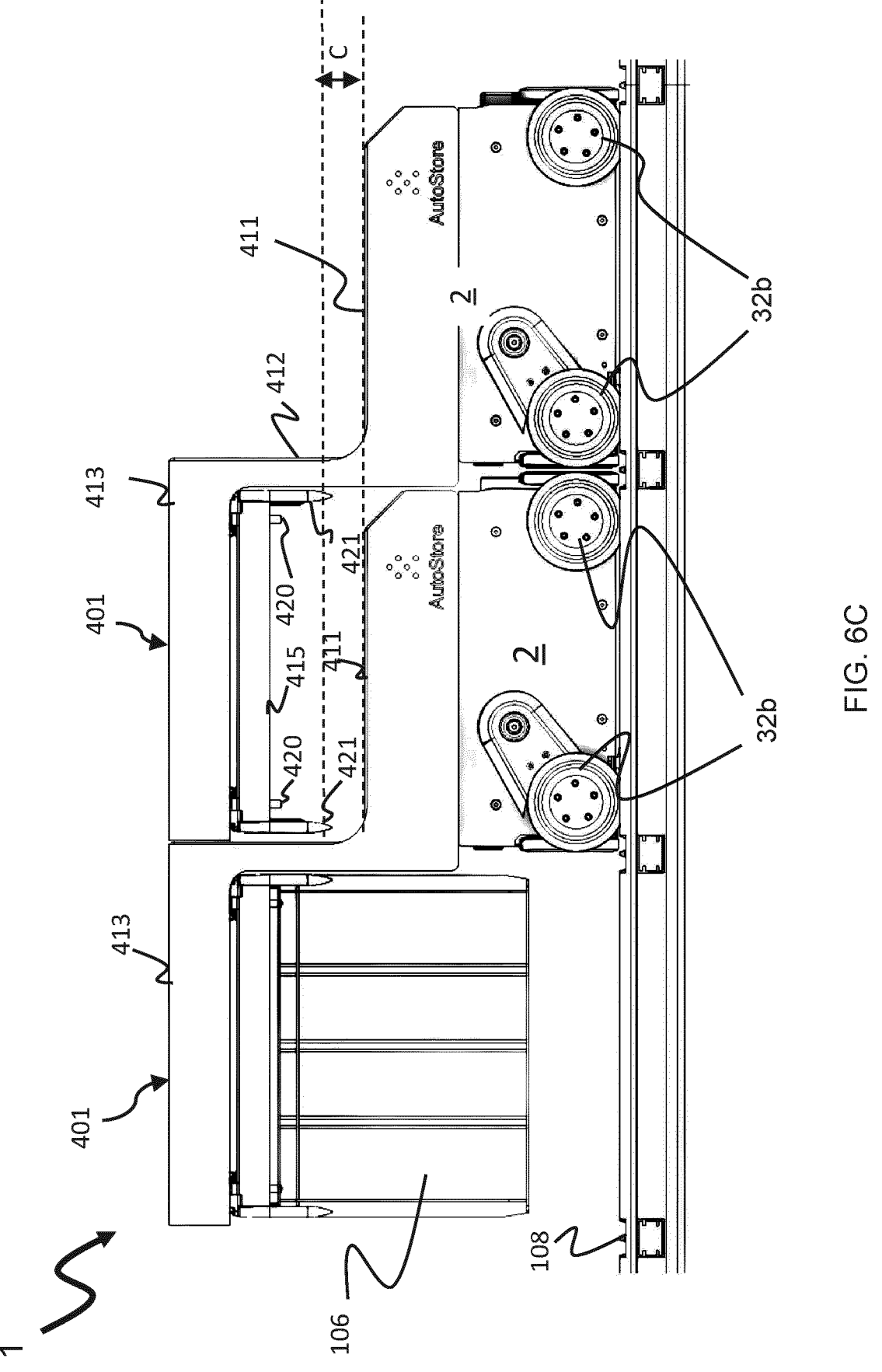

FIGS. 6A-6C show different views of a first embodiment of two container handling vehicles 401 passing each other, where one of the container handling vehicles 401 is able to carry a storage container 106 when passing another container handling vehicle 401 in the same orientation. Thus, two container handling vehicles 401 can occupy fewer grid cells 122 when passing each other than with the prior art cantilever container handling vehicles because a cantilever section 413 of one is able to pass over the lower section 411 and wheel base unit 2 of the other (with a clearance). During the passing, the cantilever section 413 of one container handling vehicle will overlap vertically with the lower section 411 and wheel base unit 2 of the other container handling vehicle 401.

As is seen FIGS. 6A-6C, the difference in the first height h1 of the upper surface of the lower section 411 and the second height h2 of the lowermost part of the lifting frame 415, is less than the height of the storage container 106, which results in that only the "front" container handling vehicle (i.e. the container handling vehicle to the left in the figure) can carry a storage container during passing. However, with this arrangement, during passing the container handling vehicles occupy fewer grid cells 122 than compared to the prior art cantilever vehicles, namely three grid cells 122 rather than four. A clearance c is shown between the lower section 411 of the container handling vehicle 401 to the left in FIG. 6C and the lowermost part of the lifting frame 415 of the container handling vehicle 401 to the right in FIG. 6C.

The container handling vehicles 401 form part of an automated storage and retrieval system 1 comprising a rail system 108 on which the container handling vehicles 401 operate.

As seen in FIG. 6C, a footprint of the lower section 413 of the body unit 410 may be displaced with respect to the footprint of the wheel base unit 2 by substantially or equally a width of a wheel 32a, 32b. The lower section 411 is positioned to extend vertically from the outer edge of the second track under the cantilever section 413 and from the inner edge of the first track on the opposite side, when the wheel base unit 2 has its wheels 32a positioned over the first tracks (or tracks closest to the grid opening). When two container handling vehicles 401, which have the same orientation as shown in FIGS. 6A-6C, pass each other, they occupy a total of three grid cells 122.

Figures 7A, 7B:
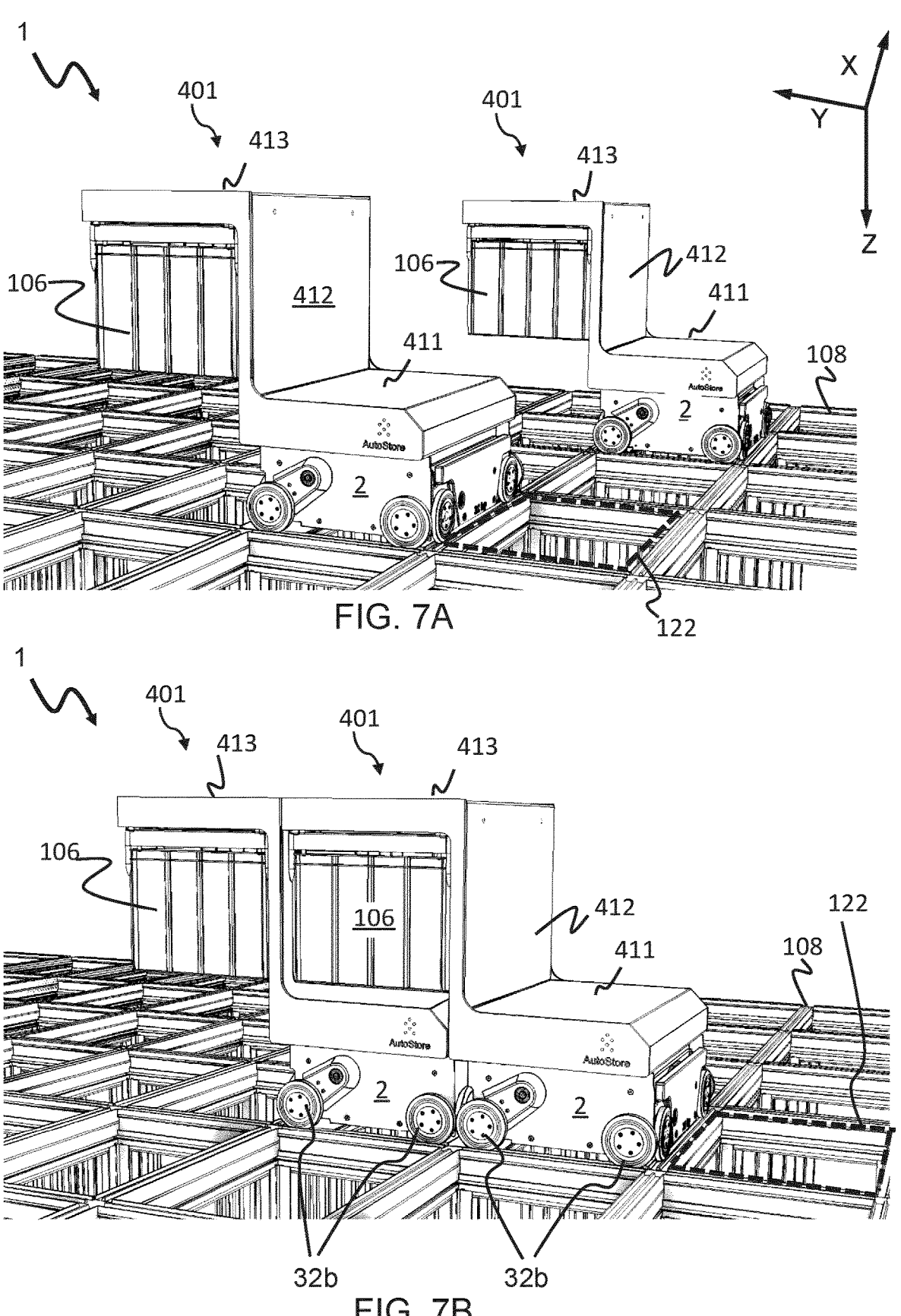
FIGS. 7A-7C show different views of a second embodiment of two container handling vehicles passing each other, where both of the container handling vehicles can carry a storage container during passing.
Figures 7C, 7D:
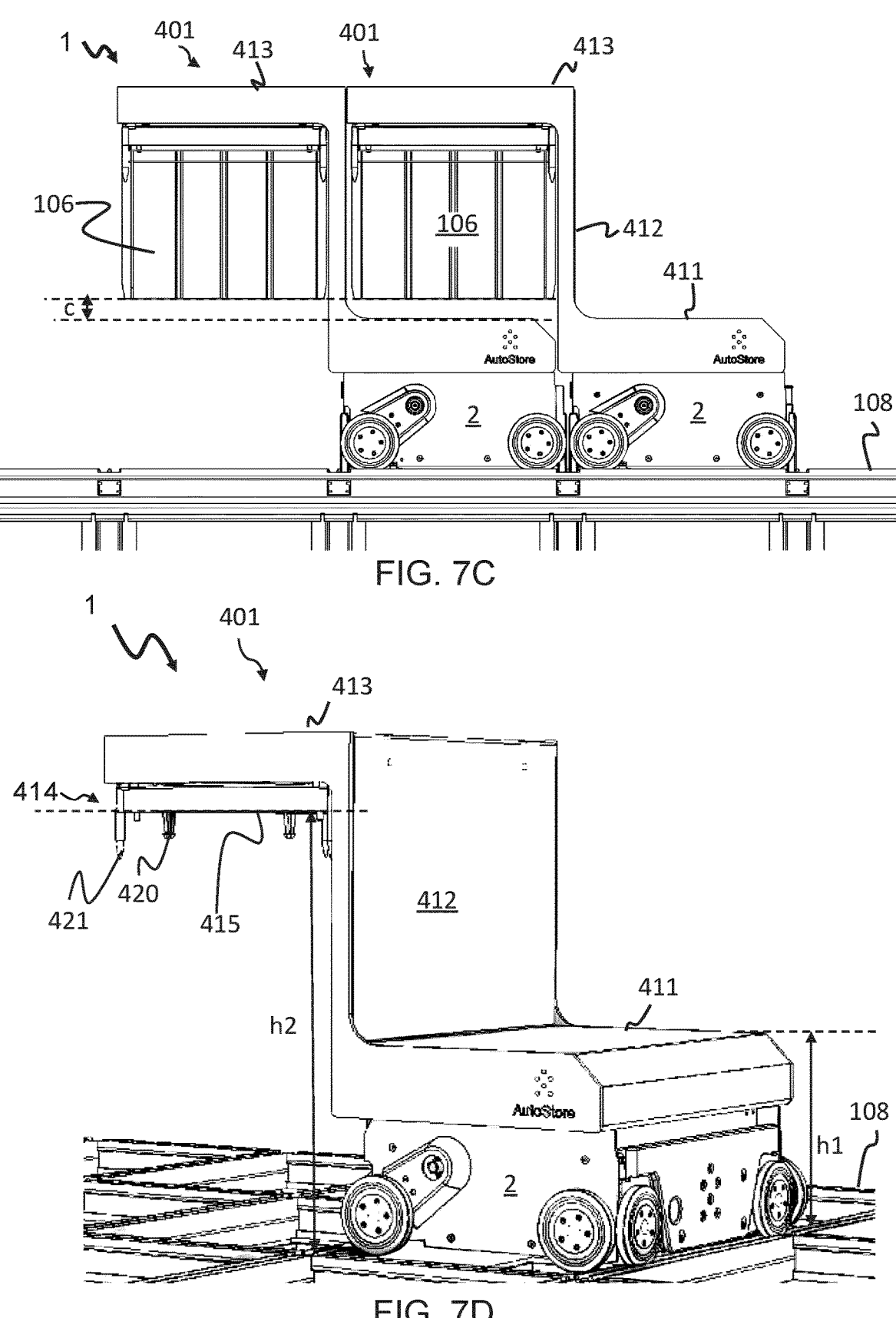
FIG. 7D shows a container handling vehicle according to the second embodiment of FIGS. 7A-7C when not carrying a storage container.

FIGS. 7A-7C show different views of a second embodiment of two container handling vehicles 401 passing each other, where both of the container handling vehicles 401 can carry a storage container during passing. The container handling vehicles 401 form part of an automated storage and retrieval system 1 comprising a rail system 108 on which the container handling vehicles 401 operate.

FIG. 7D shows a container handling vehicle according to the second embodiment of FIGS. 7A-7C when not carrying a storage container. As indicated in FIGS. 7A-7D, the difference between the second height h2 and the first height h1 is at least corresponding to a height of a storage container 106 including a minor clearance c (see FIG. 7C).

Figure 8:
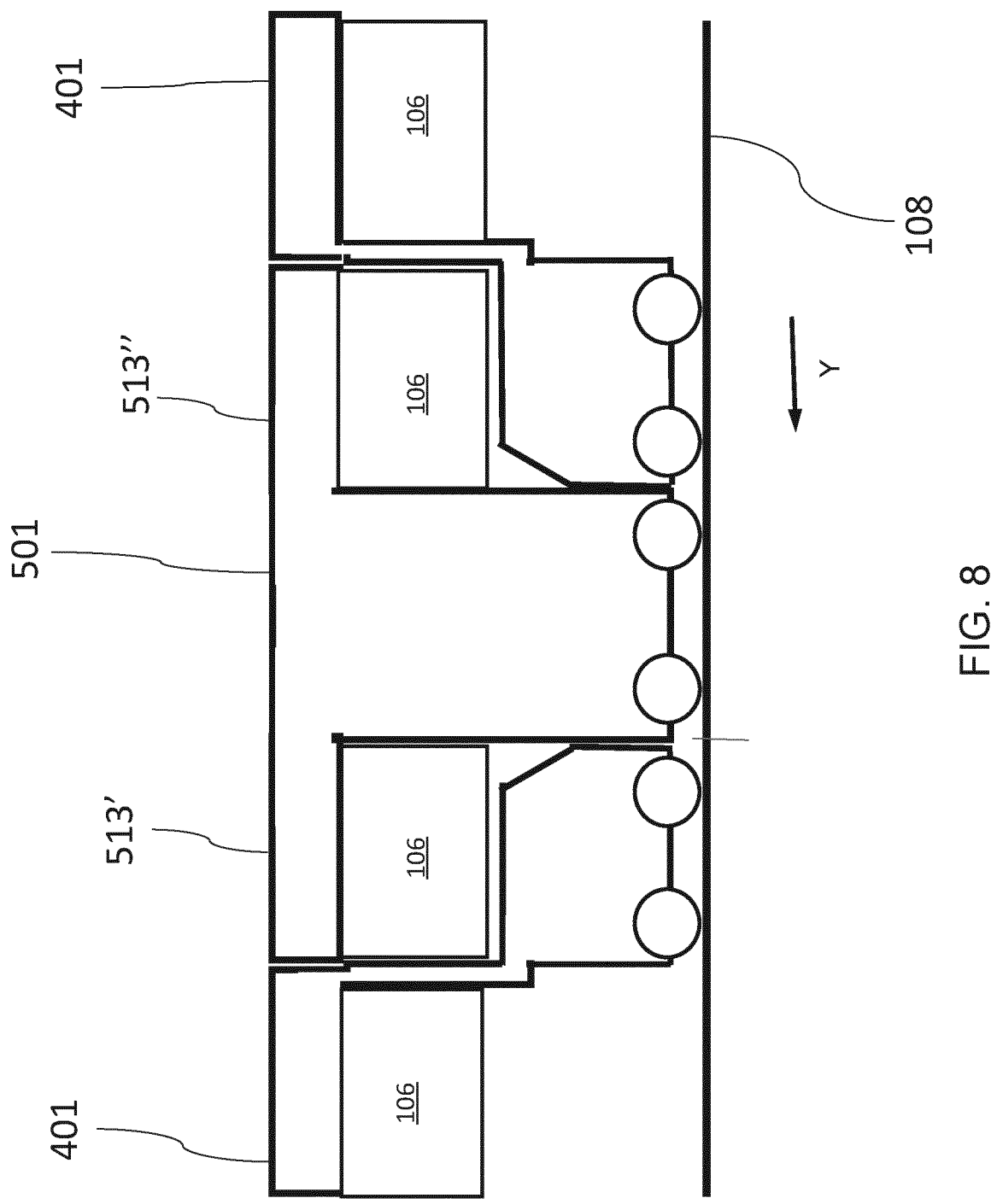
FIG. 8 shows an embodiment with a dual container handling vehicle having two cantilever sections on opposite ends thereof as well as two container handling vehicles with opposite orientation relative each other such that the three container handling vehicles only occupy five cells when passing each other.

FIG. 8 shows an embodiment with a dual container handling vehicle 501 comprising a first cantilever section 513" arranged opposite a second cantilever section 513'. The container handling vehicles 401 in FIG. 8 are container handling vehicles according to the second embodiment (i.e. as disclosed in FIGS. 7A-7C where both of the container handling vehicles 401 can carry a storage container during passing). The dual container handling vehicle 501 comprises two lifting devices as described above in relation to FIGS. 4A-4C, 5, 6A-6C and 7A-7C. As shown in FIG. 8 a first container handling vehicle 401 has a first orientation and a second container handling vehicle 401 has a second orientation opposite the orientation of the first container handling vehicle 401. In a prior art configuration, the dual container handling vehicle 501 and the first and second container handling vehicles 401 would occupy seven cells when passing each other, however, the container handling vehicles 401,501 as defined herein render possible that they occupy only five cells when passing each other. The dual container handling vehicle 501 in FIG. 8 carries two storage containers 106, and each of the container handling vehicles 401 carry one storage container 106 when passing.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

| List of reference numbers | |
| --- | --- |
| 1 | Prior art storage and retrieval system |
| 2 | Wheel base unit |
| 4, 4' | Electric motor |
| 6 | Rechargeable battery |
| 7 | Wheel displacement assembly |
| 8 | Electric motor for wheel displacement assembly |
| 9 | Top panel/flange |
| 10 | Through-holes |
| 20 | Centre opening |
| 21 | Electronic control system |
| 32a, 32b | Wheel arrangement, first and second set of wheels |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110 | First set of parallel rails in first direction (X) |
| 110a, 110b | Tracks of first set of rails |
| 111 | Second set of parallel rail in second direction (Y) |
| 111a, 111b | Tracks of second set of rails |
| 112 | Access opening/grid column |
| 115 | Grid opening |
| 119 | First port column |
| 120 | Second port column |
| 122 | Grid cell |
| 201 | Prior art storage container vehicle |
| 201a | Vehicle body of the storage container vehicle 201 |
| 201b | Drive means/wheel arrangement, first direction (X) |
| 201c | Drive means/wheel arrangement, second direction (Y) |
| 301 | Prior art cantilever storage container vehicle |
| 301a | Vehicle body of the storage container vehicle 301 |
| 301b | Drive means in first direction (X) |
| 301c | Drive means in second direction (Y) |
| 304 | Parts of the gripping device of the container handling vehicle 301 |
| 401 | Container handling vehicle |
| 410 | Body unit |
| 411 | Lower section of body unit |
| 412 | Support section of body unit |
| 413 | Cantilever section of body unit |
| 414 | Lifting device |
| 415 | Lifting frame |

-continued

| List of reference numbers | |
| --- | --- |
| 416', 416" | Lifting device motor |
| 417', 417" | Lifting shaft |
| 418 | Force transferring element |
| 419 | Lifting band |
| 420 | Gripping device |
| 421 | Guide |
| 422', 422" | sheaves |
| 423', 423" | Lifting shaft wheels |
| 424 | Tightening wheel |
| 500 | Control system |
| 501 | Dual container handling vehicle with two cantilever sections |
| X | First direction |
| Y | Second direction |
| Z | Third direction |
| C | clearance |
| h1 | First height |
| h2 | Second height |

The invention claimed is:

1. A container handling vehicle for operation on a rail system, wherein the container handling vehicle comprises:
   a wheel base unit comprising sets of wheels for guiding the container handling vehicle along the rail system;
   a body unit comprising:
      a lower section which is provided on the wheel base unit, the lower section having a top surface which is at a first height;
      a support section extending vertically from the lower section, and
      a cantilever section extending horizontally from the support section beyond the lower section;
   a lifting device comprising a lifting frame that is suspended from the cantilever section of the body unit, the lifting frame having a lowermost part at a second height when the lifting frame is docked in an upper position adjacent the cantilever section,
   wherein the second height of the lowermost part of the lifting frame, when the lifting frame is docked in its upper position, is above the first height of the top surface of the lower section of the body unit, and wherein a difference between the first height and the second height corresponds to at least a height of a storage container.

2. The container handling vehicle according to claim 1, wherein the lifting device comprises a lifting device motor and at least two lifting shafts, and wherein the at least two lifting shafts are arranged in the cantilever section and the lifting device motor is arranged in the lower section, and wherein the lifting device motor and at least two lifting shafts are connected to each other via a flexible force transferring element.

3. The container handling vehicle according to claim 1, wherein the lifting device comprises a lifting device motor and at least two lifting shafts for raising and lowering the lifting device, wherein the lifting device motor and the at least two lifting shafts are arranged in the cantilever section.

4. The container handling vehicle according to claim 1, wherein the body unit comprises an S-shaped housing linking the lower section, the support section, and the cantilever section together.

5. The container handling vehicle according to claim 1, wherein a footprint of the lower section of the body unit is displaced with respect to the footprint of the wheel base unit by substantially or equally a width of a wheel.

6. The container handling vehicle according to claim 1, wherein the lifting frame is suspended on lifting bands, and wherein the lifting frame extends a horizontally and comprises gripping devices and corner guides, wherein a lowermost point of the corner guides provides the lowermost part of the lifting frame.

7. An automated storage and retrieval system comprising a rail system and a plurality of container handling vehicles according to claim 1.

8. The automated storage and retrieval system according to claim 7, wherein two container handling vehicles, which have the same orientation, occupy three grid cells when passing each other.

9. The automated storage and retrieval system according to claim 8, wherein the two container handling vehicles are configured such that the lowermost part of a docked lifting frame of a first container handling vehicle can pass over the top surface of a lower section of the body unit of a second container handling vehicle when the first and second container vehicles pass one another on adjacent grid cells.

10. The automated storage and retrieval system according to claim 7, wherein the first set of rails and or the second set of rails comprises either a single track, or a double track comprising two tracks, and wherein a grid cell is defined as the horizontal area occupied by a grid opening delimited by the first set of rails and the second set of rails together with an area occupied by single tracks of the first and second sets of rails in the first and second directions enclosing and being arranged closest to the single grid opening.

11. The automated storage and retrieval system according to claim 7, wherein the wheel base unit has a footprint equal to a horizontal extent in the first and second directions of a grid cell.

12. The automated storage and retrieval system according to claim 7, wherein at least one of the container handling vehicles is able to carry a storage container when passing another container handling vehicle.

13. The automated storage and retrieval system according to claim 12, wherein a lowermost point of the storage container when carried is higher than the first height of the lower section.

14. The automated storage and retrieval system according to claim 7, wherein a width of the support section in one direction corresponds to the width of a rail and/or two tracks.

15. The automated storage and retrieval system according to claim 7, further comprising at least one dual container handling vehicle comprising a first cantilever section arranged opposite a second cantilever section.

16. The automated storage and retrieval system according to claim 15, wherein at least a first container handling vehicle has a first orientation and at least a second container handling vehicle has a second orientation opposite the first orientation, and wherein the dual container handling vehicle and the first and second container handling vehicles occupy five grid cells when simultaneously passing each other.

17. The automated storage and retrieval system according to claim 7, wherein the rail system is two-dimensional and further comprises a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction, the first and second sets of parallel rails dividing the rail system into a plurality of grid cells.

18. The container handling vehicle according to claim 1, wherein the container-handling vehicle is for operation on a two-dimensional rail system comprising a first set of parallel rails arranged to guide movement of container handling vehicles in a first direction across the top of a frame structure, and a second set of parallel rails arranged perpendicular to the first set of rails to guide movement of the container handling vehicles in a second direction which is perpendicular to the first direction, the first and second sets of parallel rails dividing the rail system into a plurality of grid cells, and wherein:

the wheels are for guiding the container handling vehicle along the rail system in the first and second directions;

the lower section of the body unit has a footprint with a horizontal extent which is equal to or less than the horizontal extent of one or the grid cells;

the support section has a footprint with a horizontal extent which is smaller than the footprint of the lower section; and the cantilever section extends beyond the footprint of the lower section.

* * * * *